US010630413B2

(12) United States Patent
Jiang

(10) Patent No.: US 10,630,413 B2
(45) Date of Patent: Apr. 21, 2020

(54) OPTICAL COMMUNICATIONS SYSTEM WITH CENTRALIZED WAVELENGTH SOURCE

(71) Applicant: HUAWEI TECHNOLOGIES CO., LTD., Shenzhen (CN)

(72) Inventor: Zhiping Jiang, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/164,165

(22) Filed: May 25, 2016

(65) Prior Publication Data
US 2017/0346589 A1    Nov. 30, 2017

(51) Int. Cl.
| H04J 14/02 | (2006.01) |
| H04B 10/272 | (2013.01) |
| H04B 10/50 | (2013.01) |
| H04Q 11/00 | (2006.01) |

(52) U.S. Cl.
CPC .......... *H04J 14/02* (2013.01); *H04B 10/506* (2013.01); *H04J 14/0257* (2013.01); *H04J 14/0267* (2013.01); *H04J 14/0275* (2013.01); *H04Q 11/0005* (2013.01); *H04Q 11/0062* (2013.01); *H04B 10/272* (2013.01); *H04J 2014/0253* (2013.01); *H04Q 2011/0009* (2013.01); *H04Q 2011/0016* (2013.01); *H04Q 2011/0022* (2013.01); *H04Q 2011/0094* (2013.01)

(58) Field of Classification Search
CPC .................................................. H04B 10/2587
See application file for complete search history.

(56) References Cited

U.S. PATENT DOCUMENTS

| 5,221,983 | A | * | 6/1993 | Wagner | H04B 10/272 398/167.5 |
| 5,559,624 | A | * | 9/1996 | Darcie | H04B 10/071 398/167.5 |
| 7,113,662 | B2 | * | 9/2006 | Persson | H04J 14/0206 385/16 |
| 7,127,168 | B2 | * | 10/2006 | Kani | H04B 10/506 398/79 |
| 7,424,223 | B1 | * | 9/2008 | Lundquist | G02B 6/12021 385/24 |

(Continued)

FOREIGN PATENT DOCUMENTS

| KR | 20040067082 A | 7/2004 |
| WO | 2010046714 A2 | 4/2010 |

OTHER PUBLICATIONS

Goebuchi et al., Optical cross-connect circuit using hitless wavelength selective switch, 2008, OSA, pp. 535-548.*

(Continued)

*Primary Examiner* — Jai M Lee

(57) ABSTRACT

The disclosure is directed to an optical telecommunications system which includes a central node and a plurality of user nodes. The central node provides the light necessary to enable communication between the user nodes. Within the central node is a multi-wavelength source, providing lights at different wavelengths, along with a wavelength selector. The wavelength selector selects one of the lights at different wavelengths from the multi-wavelength source for delivery to the user nodes such that the user nodes then modulate this light for transmission between nodes.

11 Claims, 8 Drawing Sheets

(56) References Cited

U.S. PATENT DOCUMENTS

| | | | |
|---|---|---|---|
| 7,800,755 B1 | 9/2010 | Poirier et al. | |
| 8,644,714 B2 | 2/2014 | Kwon et al. | |
| 8,818,207 B2* | 8/2014 | Tanaka | H04B 10/506 398/182 |
| 2002/0122219 A1* | 9/2002 | Funk | H04L 41/0253 398/1 |
| 2003/0039010 A1* | 2/2003 | Akimoto | H04B 10/40 398/139 |
| 2003/0067649 A1* | 4/2003 | Suzuki | H04J 14/02 398/79 |
| 2004/0208520 A1* | 10/2004 | Palacharla | H04B 10/0771 398/30 |
| 2005/0047784 A1* | 3/2005 | Jung | H04B 10/2587 398/72 |
| 2006/0045525 A1* | 3/2006 | Lee | H04B 10/25752 398/71 |
| 2006/0188258 A1* | 8/2006 | Gumaste | H04J 14/0227 398/59 |
| 2008/0013950 A1* | 1/2008 | Boudreault | H04J 14/0212 398/59 |
| 2008/0131125 A1* | 6/2008 | Byoung Whi | H04B 10/2587 398/72 |
| 2011/0217039 A1* | 9/2011 | Smith | H04J 14/02 398/49 |
| 2015/0277053 A1* | 10/2015 | Zheng | G02B 6/29341 385/31 |
| 2015/0341137 A1* | 11/2015 | Kaneko | H04B 10/272 398/67 |
| 2016/0105736 A1* | 4/2016 | Dai | H04Q 11/0005 398/49 |

OTHER PUBLICATIONS

Wikipedia, Arrayed waveguide grating, https://en.wikipedia.org/wiki/Arrayed_waveguide_grating, Jun. 2015.*

El-Bawab, Tarek S., Optical Switching, 2006, Springer Science+Business Media, Inc., p. 202.*

Nikolova et al., A highly scalable fully non-blocking silicon photonic switch fabric, Dec. 2015.*

International Search Report for corresponding PCT application No. PCT/CN2017/083776 dated Jul. 31, 2017.

* cited by examiner

OPTICAL COMMUNICATIONS SYSTEM WITH CENTRALIZED WAVELENGTH SOURCE

FIELD OF THE DISCLOSURE

The present disclosure relates generally to optical telecommunications and, more particularly, to wavelength division multiplexed optical communications systems.

BACKGROUND

In the field of optical communications, the use of light to carry information is the basis of the technology. The transmission of light between nodes within an optical communications system allows information and data to be passed between these nodes. Typically, a transmitter within a first node encodes a high-rate digital stream of information onto a light beam at a particular wavelength to provide a modulated light beam, referred to as a wavelength channel. Many wavelength channels may be combined in a wavelength-division multiplexor for joint amplification and propagation in an optical fiber to a destination. Different nodes of an optical network typically have dedicated light source for transmission of optical signals between each other, as well as wavelength-selective filters for adding and dropping wavelength channels. The light sources at the nodes may include a multi-wavelength, switchable light source for providing wavelength channels at different wavelengths.

As the number and flexibility of utilization of wavelength channels grows, so is the complexity of wavelength channel control and management. Multiple added and dropped wavelength channels need to be routed to their proper destinations without disrupting wavelength channels traveling through a node to a remote destination, in a dynamic, reconfigurable manner.

An improved optical communications system to overcome disadvantages of current systems would be highly desirable in order to provide a low-cost, efficient solution for enabling dynamically reconfigurable, efficient optical communications.

SUMMARY

The following presents a simplified summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

The present disclosure is directed to an optical communications system having a central node including a centralized multi-wavelength light source for use by user nodes within the system. The central node provides light at different wavelengths to different user nodes for modulating the light at the nodes. The modulated light is then routed by the central node to other user nodes. Unlike current systems in which each user node has its own light source, by centralizing the light source, the usage of wavelength channels for the entire optical communication system can be centrally controlled.

In accordance with the present disclosure, the centralized light source includes a multi-wavelength source and a wavelength selector which is capable of selecting one or more wavelengths to provide communication channel(s) for user nodes.

In one aspect, there is provided a central node for an optical communications system that includes a multi-wavelength source for generating light at a plurality of wavelengths. The central node also includes a wavelength selector for selective coupling of the light at the plurality of wavelengths for delivery to user nodes of the optical communications system. At the user nodes, the light is modulated to provide wavelength channels. In another aspect, the wavelength selector is optically coupled to an output of the multi-wavelength source. In a further aspect, the central node further includes a wavelength demultiplexor for demultiplexing the wavelength channels for delivery to each one of the user nodes, depending on a wavelength of each wavelength channel.

In another aspect of the disclosure, there is provided a user node for an optical communications system. The user node includes a modulator and a receiver. The user node also includes at least one wavelength-division multiplexing (WDM) demultiplexor for receiving an input from a central node. In one aspect, the input includes a wavelength channel at a wavelength dedicated to the user node and light at another wavelength. The at least one WDM demultiplexor sends the wavelength channel to the receiver and the light at the other wavelength to the modulator. In another aspect, the modulator modulates the light at the other wavelength to produce a wavelength channel at the other wavelength for transmission to the central node. The receiver decodes data from an optical signal within the wavelength channel.

In another aspect, there is provided an optical communications system including a central node and a set of user nodes. In one embodiment, the central node and the set of user nodes are configured in a star configuration.

In a further aspect, there is provided a method of providing a centralized wavelength source for optical communications. The method includes receiving a request for light at a desired wavelength from a transmission node and then selecting light at the desired wavelength from light at a plurality of wavelengths. The light at the desired wavelength is then transmitted to the transmission node for modulation into a wavelength channel at the desired wavelength. The wavelength the wavelength channel is received from the transmission node and then directed to a destination node.

In yet another aspect, there is provided a method of data transmission for a user node in an optical communications system. The method includes requesting light at a desired wavelength from a central node of the optical communications system and then separating a wavelength channel at a wavelength dedicated to the user node from the light at the desired wavelength. The wavelength channel is directed to a receiver within the user node and the light at the desired wavelength is directed to a modulator within the user node. The modulator then modulates the light at the desired wavelength to provide a wavelength channel at the desired wavelength and transmits the wavelength channel to the central node.

DRAWINGS

These and other features of the disclosure will become more apparent from the description in which reference is made to the following appended drawings.

FIG. 2a is a schematic diagram of a user node for use with the system of FIG. 1a;

FIG. 3 is a schematic diagram of an embodiment of a centralized wavelength source for use with the system of FIG. 1a;

FIG. 4 is a schematic diagram of another embodiment of a centralized wavelength source for use with the system of FIG. 1a;

FIG. 5 is a schematic diagram of a further embodiment of a centralized wavelength source for use with the system of FIG. 1a; and FIG. 6 is a schematic diagram of yet another embodiment of a centralized wavelength source for use with the system of FIG. 1a.

DETAILED DESCRIPTION

The following detailed description contains, for the purposes of explanation, numerous specific embodiments implementations, examples and details in order to provide a thorough understanding of the disclosure. It is apparent, however, that the embodiments, may be practiced without these specific details or with an equivalent arrangement. In other instances, some well-known structures and devices are shown in block diagram form in order to avoid unnecessarily obscuring the embodiments of the disclosure. The description should in no way be limited to the illustrative implementation, drawings and techniques illustrated below, including the exemplary designs and implementations illustrated and described herein, but may be modified within the scope of the appended claims along with their full scope of equivalents.

The disclosure is directed to an optical communications system which includes a central node and a plurality of user nodes which are connected to the central node. Within the central node is a centralized wavelength source which provides light at different wavelengths for modulation by user nodes to carry digital data streams throughout the system. Herein and throughout the specification, the term "wavelength source" is used to briefly denote a light source providing essentially unmodulated light at different wavelengths for subsequent modulation or other usage. A modulated light at a particular wavelength is termed herein "wavelength channel".

An advantage of the disclosed system is that fewer wavelength sources are required for the overall system as a single wavelength source satisfies the requirements of each of the user nodes. In an optical communications system with many user nodes, this reduction in the number of wavelength sources is beneficial.

Figure 1A:
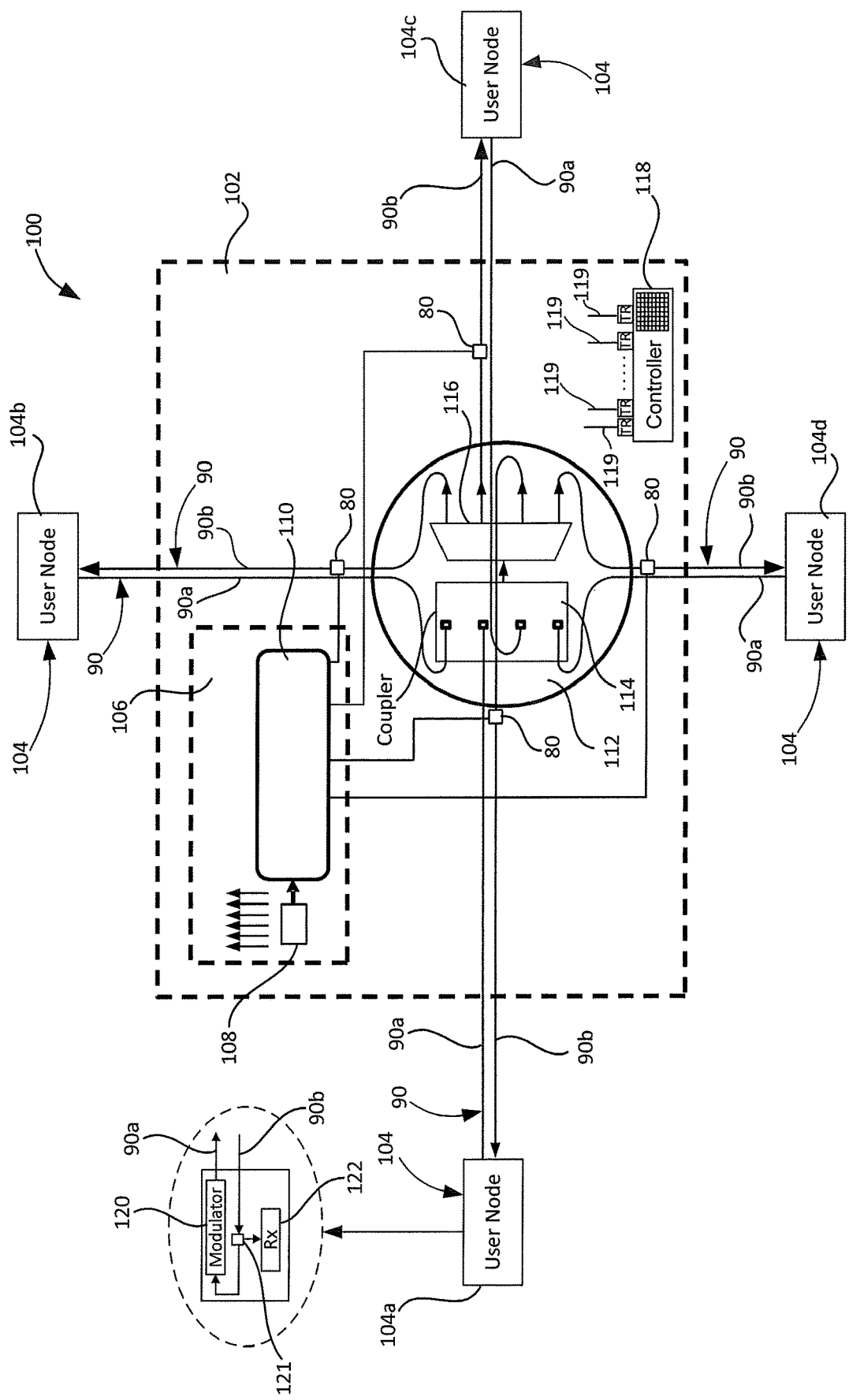
FIG. 1a is a schematic diagram of one embodiment of an optical telecommunications system.

Turning to FIG. 1a, there is provided a schematic diagram of an optical communications architecture, or system with a centralized wavelength source. The system 100 includes a central node 102 connected to a set of user nodes 104 (which in the current embodiment equals four (4)) preferably in a star configuration. Although shown with four user nodes 104 in the current embodiment, a reasonably large number of user nodes 104 may be selected for the system 100. This number may be determined based on the properties of the central node 102, as will be discussed below.

The central node 102 and user nodes 104 are connected to each other via a set of optical transmission fibers 90 which in the current embodiment includes two optical fibers: an inbound optical fiber 90a carrying light traveling from the user nodes 104 towards the central node 102, and an outbound optical fiber 90b carrying light traveling from the central node 102 towards the user nodes 104. The inbound 90a and outbound 90b optical fibers are used to provide bidirectional communication between the user nodes 104 and/or the central node 102. Although only two optical fibers 90 are shown, the set of optical transmission fibers 90 may include any number of optical transmission fibers. The optical transmission fibers 90 serve to transmit light between the central node 102 and each user node 104.

In the current embodiment, the central node 102 includes a multi-wavelength source 108 and a wavelength selector 110 forming a centralized wavelength source (CWS) 106. The multi-wavelength source 108 may be a multi-wavelength quantum dot laser or may be a set of multiplexed single wavelength lasers. The multi-wavelength source 108 generates lights at a plurality of wavelengths simultaneously and the wavelength selector 110 selects, or selectively couples, at least one of the lights at different wavelengths to be transmitted or individually delivered to the user nodes 104. In this manner, the CWS 106 provides a single source for the necessary light at different wavelengths to enable communications between the user nodes 104 within the optical communications system 100.

In one mode of operation, the central node 102, via the CWS 106, provides a switched wavelength, as selected by the wavelength selector 110, along with an optional fixed wavelength to the various user nodes 104. The fixed wavelength may be used for a variety of purposes, for example for control purposes.

The system 100 further includes a wavelength channel routing apparatus 112 connected between the individual user nodes 104. In the embodiment of FIG. 1a, the wavelength channel routing apparatus 112 is located within the central node 102. The wavelength channel routing apparatus 112 includes an optical coupler 114 coupled to a wavelength-division multiplexing (WDM) component 116. The WDM component 116 may be a demultiplexor (demux), implemented as an arrayed waveguide grating router (AWGR), for example. The optical coupler 114 has multiple input ports, each coupled to a corresponding inbound optical fiber 90a and a single output port connected to the WDM component 116. The WDM component 116 includes multiple output ports, each coupled to a corresponding outbound optical fiber 90b. The outputs of the WDM component 116 may also be coupled with an output of the wavelength selector 110 via a WDM filter, or coupler 80.

In the configuration shown, each user node 104 is assigned a dedicated wavelength for carrying data or streams of information towards that user node 104 such that none of the user nodes 104 are assigned an identical wavelength being supplied by the multi-wavelength source 108. Due to this, the number of user nodes 104 within the system 100 is limited by the number of different wavelengths that is provided by the multi-wavelength source 108.

The dedicated wavelength is assigned or determined by the output connection of the WDM component 116, which couples optical paths of light at the dedicated wavelengths to the corresponding user nodes 104 via the corresponding outbound optical fiber 90b. Thus, a center wavelength of a wavelength channel propagating from one of the user nodes 104 to the central node 102 determines to which one of the user nodes 104 the modulated light will go.

A controller 118 may be configured to coordinate the delivery of light at different wavelengths to the user nodes 104, thereby determining the physical communication links between the different user nodes 104. Furthermore, a set of out-of-band (OOB) channels 119 may be provided to allow for the exchange of information, such as, but not limited to control information, between the central node 102 and the user nodes 104.

The controller 118 may perform other tasks, such as, but not limited to, receiving and/or transmitting the OOB channels 119, scheduling and time slot misalignment measurements. The user node OOB channels (from the user nodes 104 to the central node 102) are used to carry information such as, but not limited to, traffic demand, slot timing, or wavelength scheduling. These user node OOB channels are also used to measure the time slot misalignment measurements at the central node 102. The central node OOB channels (from the central node 102 to the user nodes 104) carry information, such as, but not limited to, wavelength assignments. In a preferred embodiment, a number of OOB channels 119 equals a number of user nodes 104.

In one embodiment, in order to provide high-speed reconfigurability of the physical communication links between the central node 102 and the user nodes 104, the wavelength selector 110 preferably has a fast switching time, for example tens of nanoseconds or less. The switching time refers to the time that elapses between the transmissions of two different wavelengths over an individual fiber. The time of providing light at a dedicated wavelength depends on the switching time of the wavelength selector 110.

Turning to the user nodes 104, each of the user nodes 104 preferably includes a modulator 120 and a receiver 122. In the current embodiment, an output of the modulator 120 is connected, via inbound optical fiber 90*a*, to the coupler 114 of the wavelength channel routing apparatus 112. An input of the receiver 122 of each user node 104 is connected to the demux 116 via a demultiplexor 121 coupled to the outbound optical fiber 90*b*. The demultiplexor 121 directs the dedicated wavelength channel for reception by the receiver 122, while coupling light at other wavelengths to the modulator 120. The modulator 120 modulates this light to produce a wavelength channel for transmission to another node 104.

Figure 1B:
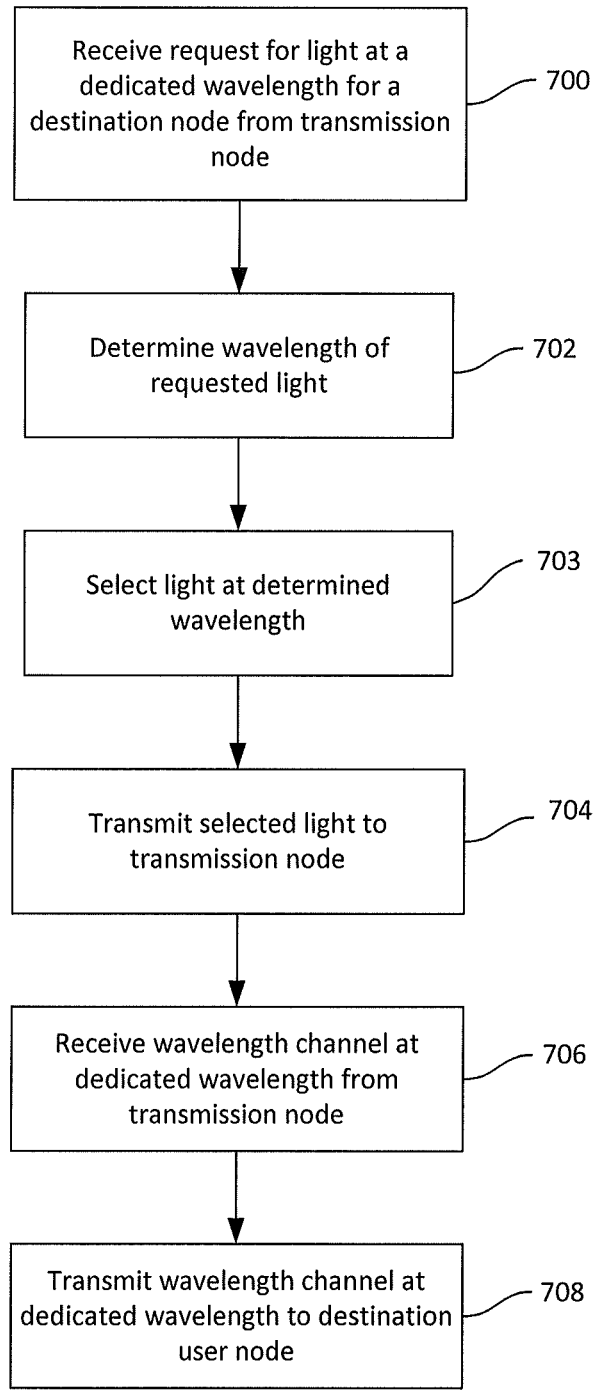
FIG. 1b is a flowchart outlining one embodiment of central node operation.

The operation of the system 100 is illustrated in FIG. 1*b*. A request is received (700) by the central node 102 from one of the user nodes 104, denoted as a transmission node, for delivery of light at a dedicated, or desired, wavelength to the transmission node. For ease of understanding, in the current example, the transmission node is the leftmost user node 104*a*. The request from the transmission node 104*a* includes a destination node to which data is to be transmitted. For ease of understanding, in the current example, the destination node is the top user node 104*b*. Based on the destination node, the central node 102 determines the dedicated wavelength for the destination node (702). The central node 102, or wavelength selector 110 then selects (703) the light at that wavelength from the output of the multi-wavelength source 108.

The light at the wavelength dedicated for the destination node is then transmitted to the transmission node (704). In one embodiment, the wavelength selector 110 is controlled by the central node 102 to send the light to the transmission node 104*a* by coupling the light to a corresponding one of the WDM filters 80, which then couples the light to the outbound optical fiber 90*b* connected to the transmission node 104*a*. In one embodiment, the light is coupled with a wavelength channel provided by one of the other user nodes. The wavelength channel centered around a wavelength dedicated to the transmission node.

At the transmission node 104*a*, the received light is modulated with a digital data stream, or digital streams of information, before being transmitted back to the central node 102.

The central node 102 receives the modulated light, or wavelength channel, (706) at the wavelength dedicated to the destination node. Since the dedicated wavelength of the wavelength channel determines where the wavelength channel will be directed by the WDM component 116, this effectively routes the digital streams of information to the destination node 104*b*.

In the embodiment shown in FIG. 1*a*, the wavelength channel is received by the optical coupler 114 of the wavelength channel routing apparatus 112, and is then directed to the demux 116. The demux 116 then directs the wavelength channel to the destination node 104*b* (708) via the outbound optical fiber 90*b* coupled to destination node 104*b*.

In order to enable time synchronization, the round trip times (RTT) between the central node 102 and the user nodes 104 are preferably designed to be the same such that their RTT are aligned at the outputs of the wavelength selector 110. This may be performed by the controller 118 via information supplied via the OOB channels 119. With different RTTs, the timing may be adjusted in such a way that the light at dedicated wavelengths is transmitted to each user node 104 at the same time as light reaching the central node 102. In some embodiments, amplification of the signal may be necessary to compensate for signal loss during transmission. The amplification may be performed by a low cost semiconductor optical amplifier (SOA) integrated within the centralized wavelength source 106. When signals are received at the central node 102 from the user nodes 104, their wavelengths are required to be mutually exclusive and their arrival time synchronized.

In some variants, amplification and polarization control (active or passive) may be required. The polarization control may be performed by using polarization maintaining optical transmission fiber.

Figure 2A:
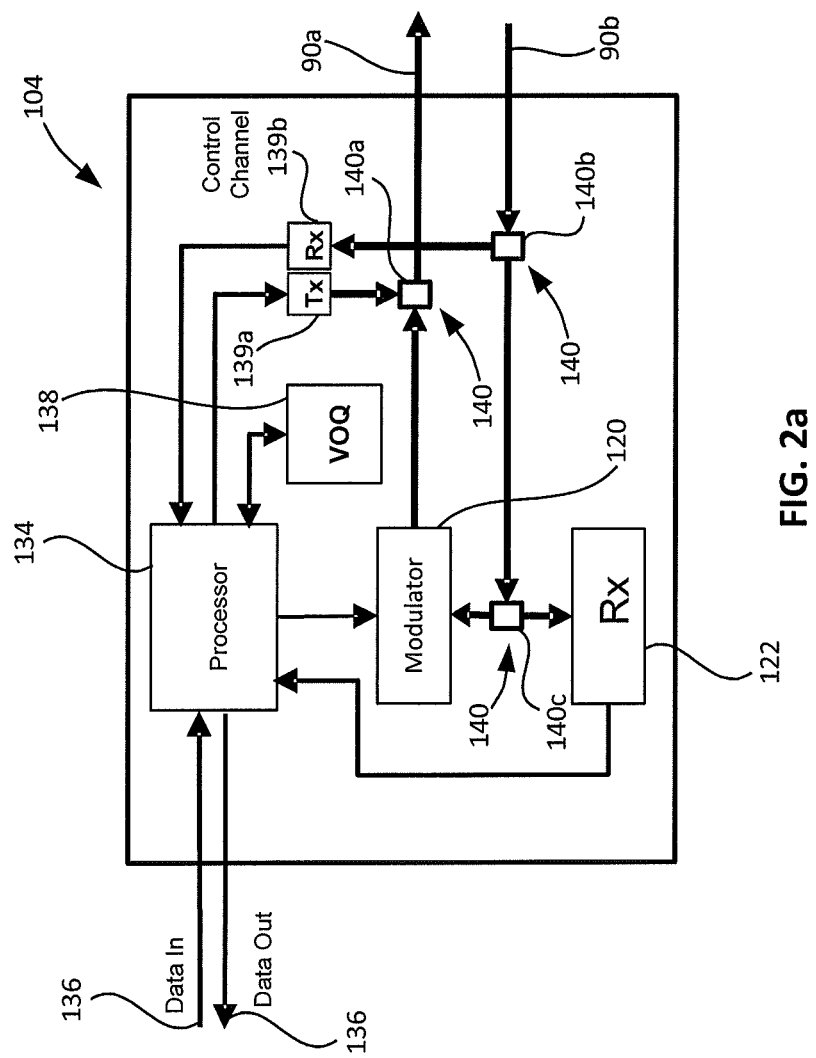

Turning to FIG. 2*a*, a schematic diagram of one embodiment of a user node 104 is shown. In the current embodiment, the user node 104 is a line card which is integrated within the optical communications system 100. The user node 104 includes the modulator 120 and the receiver 122. The user node 104 further includes input and output ports for connection with the optical transmission fibers 90. A set of WDM combiner/splitters or WDM mux/demux 140 are also located within the user node 104 to provide multiplexing and/or demultiplexing functionality.

In particular, WDM demux 140*c*, which may be the same as the demux 121 of FIG. 1*a*, receives an input from the central node 102 and separates the input for delivery to the receiver 122 and the modulator 120. The input generally includes a wavelength channel at the wavelength dedicated to the particular user node and light at a wavelength which is different from the wavelength dedicated to the particular user node. This light may be at a wavelength which is dedicated to a destination node. The demux 140*c* separates the input and directs the wavelength channel to the receiver 122 for detection and processing. The other light is sent, or directed, to the modulator 120 for modulation into a wavelength channel which is centered around the different wavelength. This wavelength channel is then transmitted to the central node 102 for delivery or direction to another user node.

The user node 104 further includes a processor 134 which is used to exchange data via a set of data lines 136 with a processing unit or data source (not shown). The processor 134 also sets up and controls signal transmitter timing, monitors and manages control channel transmitter setup and control channel receiver processing.

Virtual output queues (VOQ) 138 are connected to the processor 134 along with modulator 139a and receiver 139b controls. The VOQs 138 are connected to, and maintained by, the processor 134 along with an OOB transceiver that is associated with a control channel if OOB channels are used.

Although only a single outbound optical transmission fiber 90b is shown, it is understood that there may be multiple outbound optical transmission fibers 90b connected to the user node 104.

In the current embodiment, the WDM mux 140a may be used to combine the wavelength channel at the dedicated wavelength and an OOB channel while the WDM demux 140b may be used to separate an OOB channel from the light received when they are transmitted over the same outbound optical fiber 90b from the central node 102.

Figure 2B:
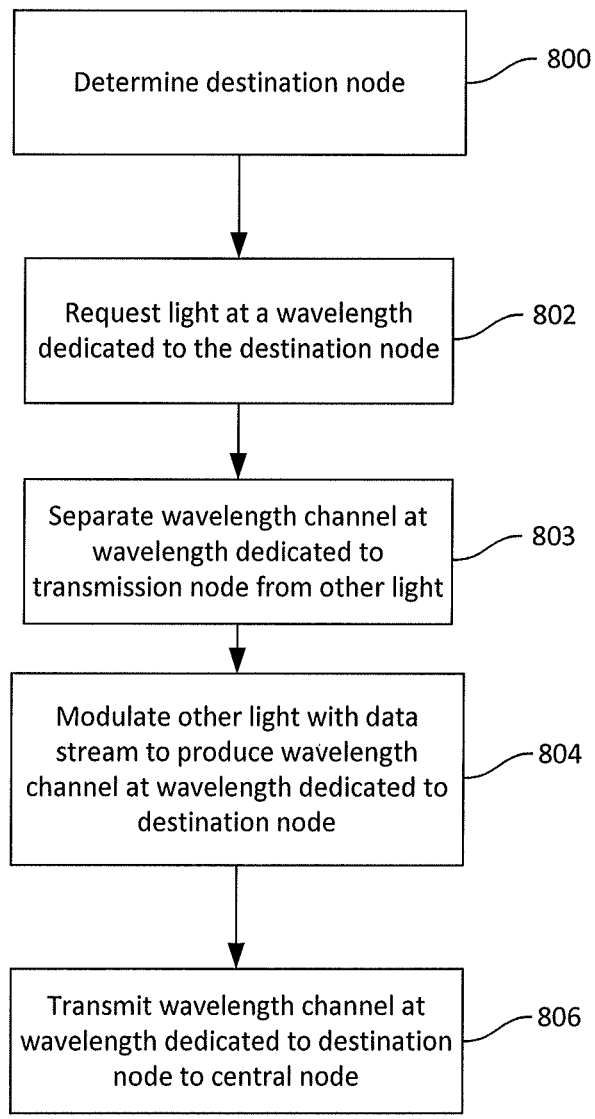
FIG. 2b is a flowchart outlining one embodiment of user node operation.

Turning to FIG. 2b, a flowchart outlining a method of data transmission is shown. After receiving data from the data source, the processor 134 determines (800) the destination node 104 and buffers the data in the VOQ 138. The processor 134 can then request (802) light at a wavelength dedicated to the destination node 104b from the central node 102.

The requested light is normally received along with a wavelength channel at the wavelength dedicated to the transmission node 104a as a central node input. The WDM demux 140c then separates (803) the wavelength channel from the requested light. The wavelength channel is delivered to the receiver 122 while the requested light is delivered to the modulator 120.

The modulator 120 modulates (804) the requested light to include the data to produce a wavelength channel at the wavelength dedicated to the destination node 104b. The user node 104 then transmits (806) this wavelength channel back to the central node 102 via the inbound optical transmission fiber 90a. The central node 102 can then deliver or direct the wavelength channel to the destination node 104b.

In another embodiment, when the central node input includes a combined fixed wavelength (at the wavelength dedicated to the transmission node 104a) and the requested light, the WDM demux 140c (or 121) separates the fixed wavelength from the requested light and transmits the requested light to the modulator 120 and the fixed wavelength to the receiver 122. If the central node input includes a wavelength channel at the wavelength dedicated to the transmission node, the demux 140c also delivers the wavelength channel to the receiver 122 for processing. The modulator 120 proceeds as outlined above with the requested light.

Figure 3:
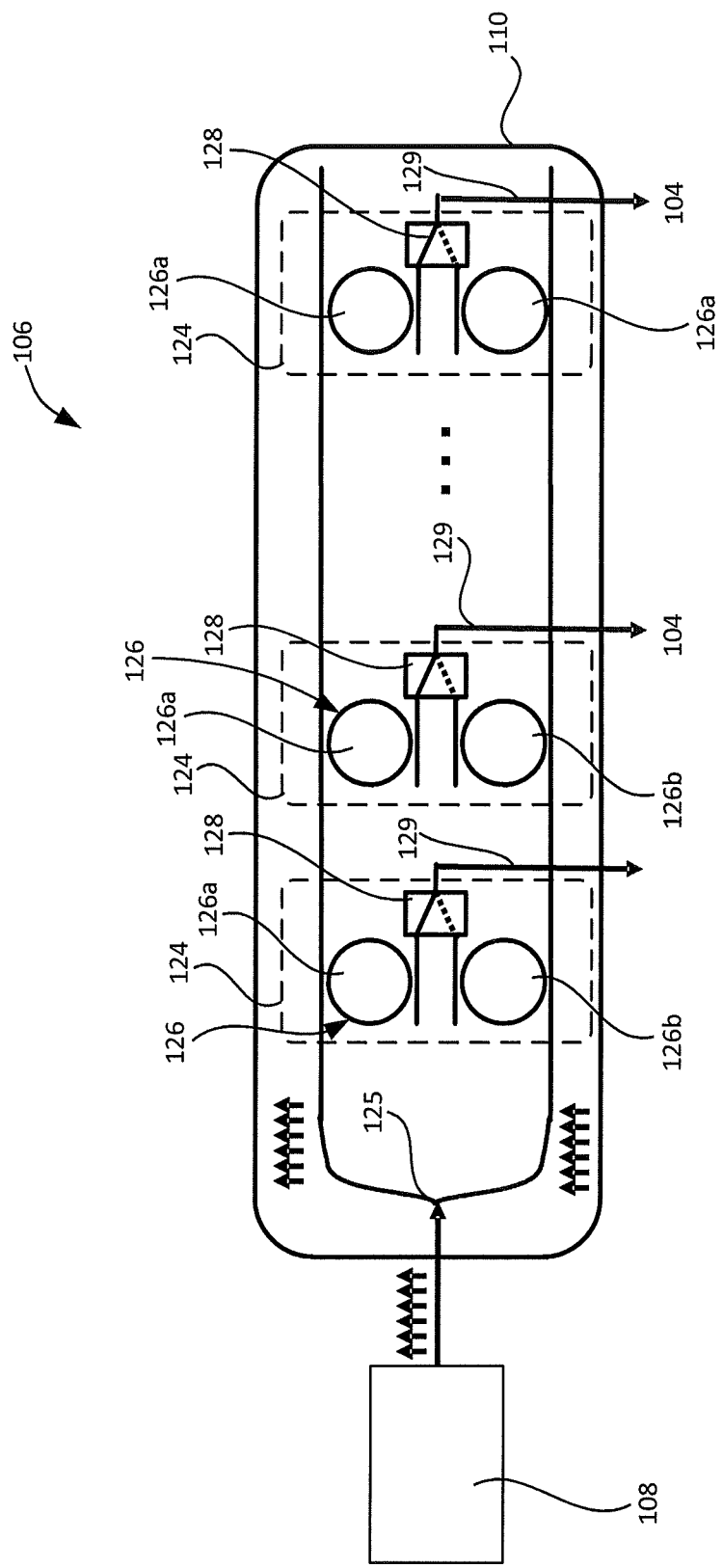

Turning to FIG. 3, a schematic diagram of a first embodiment of the CWS 106 is shown. As discussed above, the CWS 106 includes the multi-wavelength source 108 and the wavelength selector 110. In the current embodiment, the wavelength selector 110 includes a set of individual wavelength selector circuits 124 corresponding to a particular user node 104, preferably in a 1-to-1 relationship. In this manner, the wavelength selector 110 may be seen as a 1×N wavelength selector where 1 represents the single selected input from the multi-wavelength source 108 and N equals the number of user nodes 104.

Each wavelength selector circuit 124 includes at least one tuning device 126. In the embodiment of FIG. 3, the circuit 124 includes pair of tuning devices 126 where each tuning device 126 is connected to a 2×1 selector switch 128. The tuning devices 126 may include first 126a and second 126b optical ring resonators. An output 129 of each switch 128 is connected to its associated user node 104 and may be seen as being fast wavelength switched. In this context, the term "fast" is being used to describe the speed at which the wavelength is being switched. The tuning devices 126 and the switch 128 operate together to select the wavelength of light for transmission to the user nodes 104.

An output of the multi-wavelength source 108 is coupled via an optical splitter 125 to an input port of one of the first rings 126a. Although a single ring is shown, it is to be understood that the first ring 126a or the second ring 126b or both can be a set of cascaded rings. Each of the first rings 126a includes a through port connected to the input port of the first ring 126a in an adjacent wavelength selector circuit 124. Each of the first rings 126a further includes respective drop ports connected to an input of its switch 128.

Similarly, the output of the multi-wavelength source 108 is also coupled via the optical splitter 125 to an input port of one of the second rings 126b. Each of the second rings 126b includes a through port connected to the input port of the second ring 126b in an adjacent wavelength selector circuit 124. The second rings 126b also have drop ports connected to an input of its associated switch 128.

In operation, the switch 128 is controlled to selectively connect an optical path between the first ring 126a or the second ring 126b and the output 129 of the switch 128 to transmit the light at the desired, or requested, wavelength. While one of the rings 126a or 126b is connected to the output 129 of the switch 128, the other ring 126b or 126a can be tuned without affecting the output 129 of the switch 128. After the tuning has been completed, the switch 128 may then be connected to the newly tuned output of the other ring. In this manner, a slower tuning device can be used to assist in a fast selection of a light at the desired wavelength, because in this configuration, the wavelength selection time is determined by the switching time of the switch 128.

Although a specific wavelength selector 110 is shown in FIG. 2, any apparatus capable of selecting a light at a desired wavelength from a plurality of wavelengths may be used for the CWS 106. For instance, the wavelength selector 110 may include a demux which receives an input from the multi-wavelength source 108 and delivers the light at the desired wavelength to each user node 104. In another embodiment, the wavelength selector 110 includes cascaded tunable filters.

Figure 4:
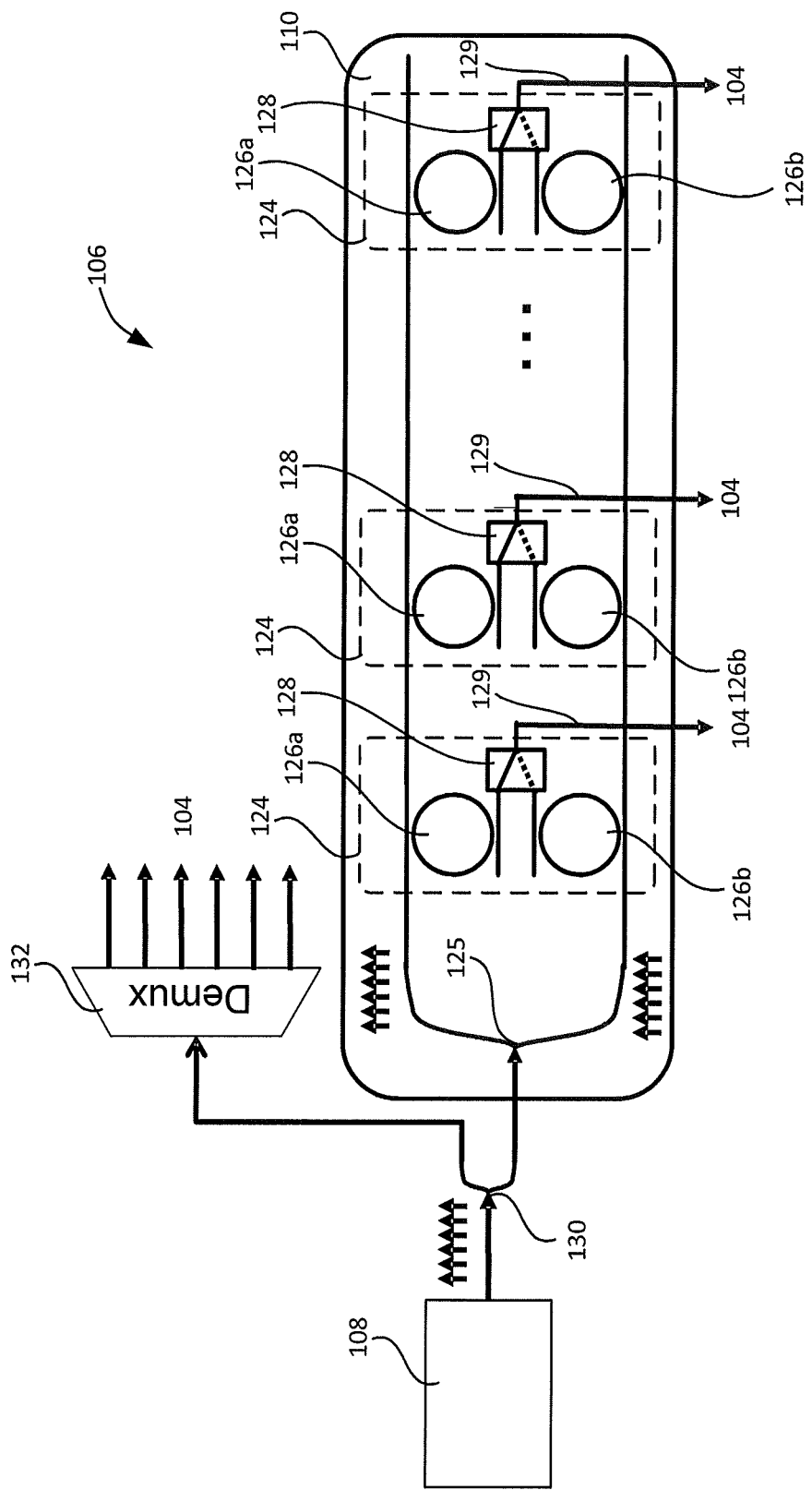

Turning to FIG. 4, another schematic diagram of an embodiment of the CWS 106 is shown. In this embodiment, the CWS 106 is suitable for a coherent transmission system. In this embodiment, a fixed wavelength optical signal may also be provided by the central node 102 to alleviate the need in a local oscillator at each user node 104, as explained below.

To that end, the CWS 106 of FIG. 4 includes the multi-wavelength source 108 and a splitter 130 coupled to an output of the multi-wavelength source 108. The splitter 130 splits the multi-wavelength signal into two portions. A first portion is coupled to the wavelength selector 110, and a second portion is coupled to a demux 132. The wavelength selector provides light at desired, or requested, wavelengths as described above. The demux 132 is used to demultiplex the second portion of the multi-wavelength signal for transmission of single-wavelength reference optical signals to the user nodes 104 for coherent detection, thus alleviating a need in a local oscillator for generation of the reference optical signals.

Figure 5:
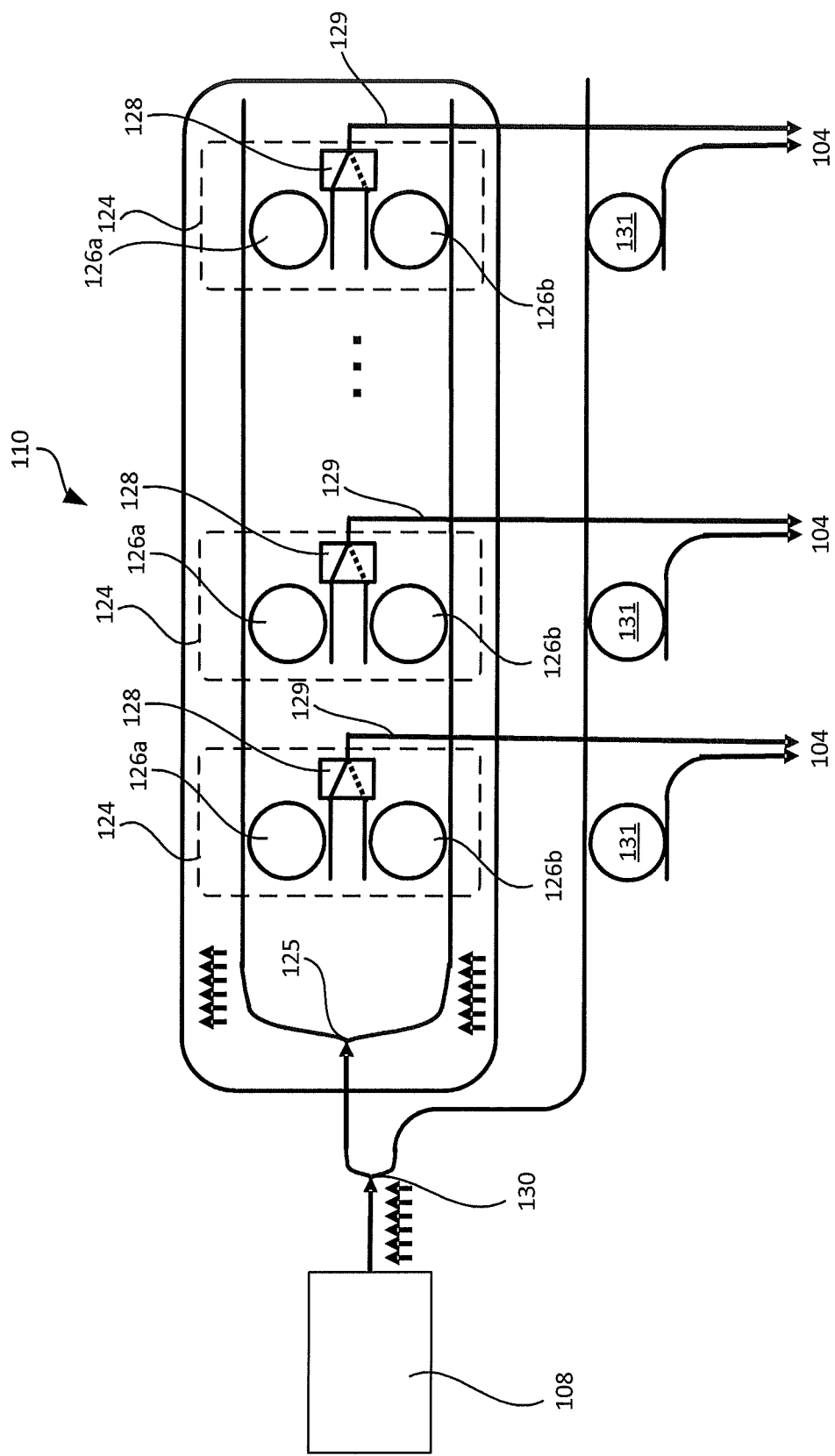

Turning to FIG. 5, a further embodiment of a CWS 106 for use in the system 100 of FIG. 1a is shown. As with the embodiment of FIG. 4, the CWS 106 of FIG. 5 is suitable for a coherent transmission system. In this embodiment, the demux 132 of FIG. 4 is replaced by a set of ring filters 131.

The CWS 106 of FIG. 5 includes the multi-wavelength source 108 and the splitter 130 coupled to an output of the multi-wavelength source 108. The splitter 130 splits the multi-wavelength signal into two portions. A first portion is coupled to the wavelength selector 110, and a second portion is coupled to the set of ring filters 131. The wavelength selector provides light at desired wavelengths as described above. The set of ring filters 131 deliver single-wavelength reference optical signals to the nodes 104 for coherent detection.

Figure 6:
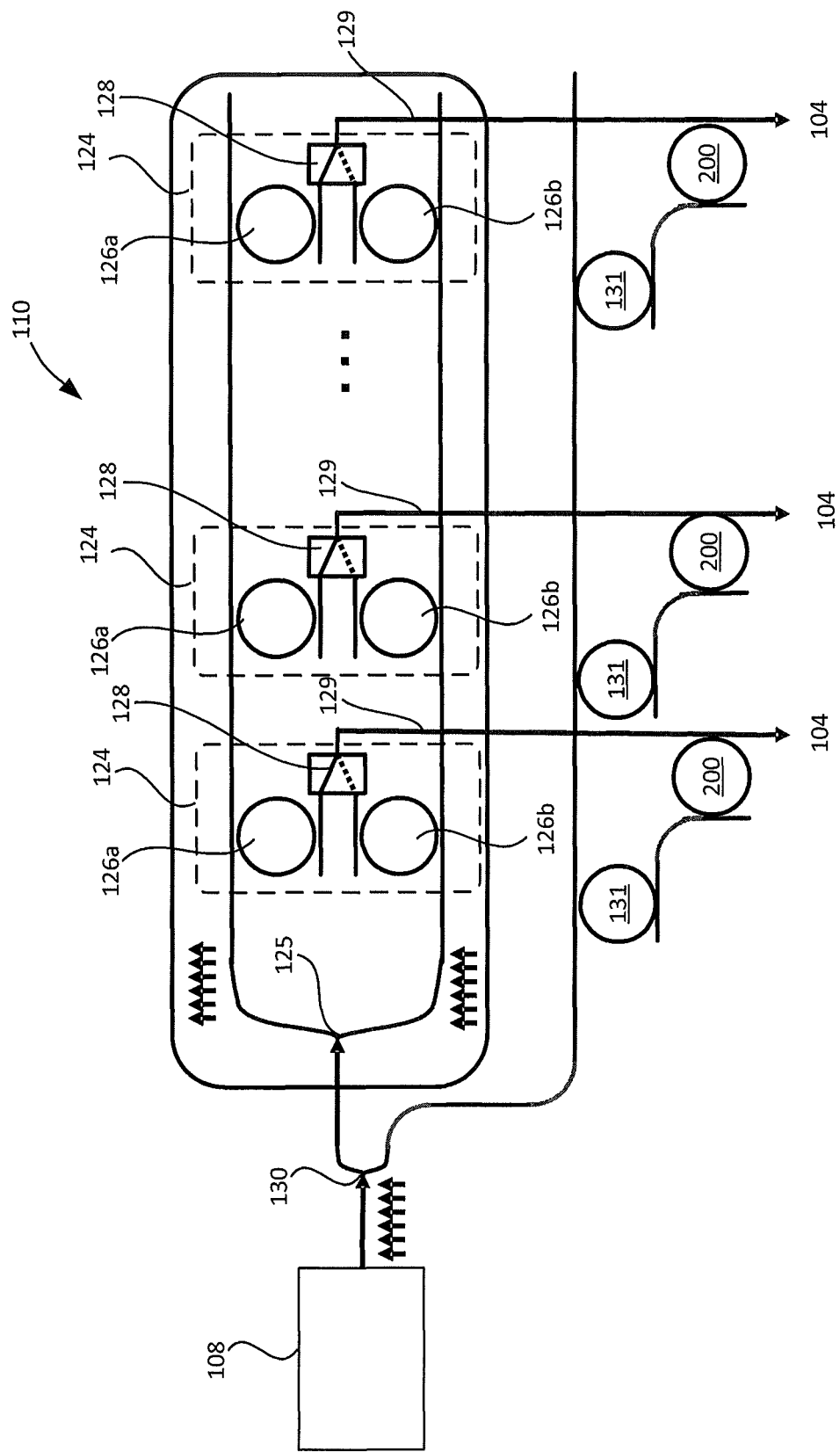

Turning to FIG. 6, a further embodiment of the CWS 106 for use in the system 100 of FIG. 1 is shown. As with the embodiment of FIGS. 4 and 5, the CWS 106 of FIG. 6 is suitable for a coherent transmission system. The embodiment of the CWS 106 of FIG. 6 is the same as the embodiment of FIG. 5 with the addition of a multiplexer 200 which combines, or couples, the single-wavelength reference optical signals and the light at desired wavelengths together prior to their transmission to the user nodes 104. By coupling these together, a single outbound transmission fiber can be used to deliver the two different wavelength outputs. As discussed above, a wavelength division multiplexing (WDM) demux is used to separate the wavelength outputs at the user node 104 for the receiver 122 and the modulator 120.

While several embodiments have been provided in the present disclosure, it should be understood that the disclosed systems and methods might be embodied in many other specific forms within departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed is:

1. A central node for an optical communications system, the central node comprising:
a multi-wavelength source for generating light at a plurality of wavelengths;
a wavelength selector, optically coupled to an output of the multi-wavelength source, for selective coupling of one or more wavelengths of the light at the plurality of wavelengths for delivery to user nodes of the optical communications system, to be modulated at the user nodes to provide wavelength channels, the wavelength selector having a set of individual wavelength selector circuits, each wavelength selector circuit corresponding to a particular one of the user nodes; and
a wavelength demultiplexor for demultiplexing the wavelength channels received from the user nodes for delivery to respective destination user nodes, depending on a wavelength of each received wavelength channel;
wherein the central node determines the one or more wavelengths of light based on the respective destination user nodes.

2. The central node of claim 1 wherein the wavelength demultiplexor comprises an arrayed waveguide grating.

3. The central node of claim 1, further comprising optical couplers for optically coupling each of the user nodes to the wavelength demultiplexor.

4. The central node of claim 1 wherein each of the set of individual wavelength selector circuits comprises:
at least one tuning device for selecting light at a particular wavelength; and
a switch.

5. The central node of claim 4 wherein the at least one tuning device comprises a pair of tuning devices.

6. The central node of claim 1 further comprising a set of wavelength-division multiplexing (WDM) couplers each optically coupled to a particular one of the set of individual wavelength selector circuits and configured for multiplexing together the light at any of the plurality of wavelengths and a wavelength channel provided by one of the user nodes.

7. The central node of claim 1 further comprising a controller configured to coordinate the delivery of light at the plurality of wavelengths to the user nodes.

8. An optical communications system comprising:
a central node including:
a multi-wavelength source for generating light at a plurality of wavelengths;
a wavelength selector, optically coupled to an output of the multi-wavelength source, for selective coupling of one or more wavelengths of the light at a plurality of wavelengths for delivery to user nodes of the optical communications system, the wavelength selector having a set of individual wavelength selector circuits, each wavelength selector circuit corresponding to a particular one of the user nodes; and
a wavelength demultiplexor for demultiplexing the wavelength channels received from the user nodes for delivery to respective destination user nodes, depending on a wavelength of each received wavelength channel;
wherein the central node determines the one or more wavelengths of light based on the respective destination user nodes; and
the user nodes, each user node including:
a modulator;
a receiver; and
at least one wavelength-division multiplexing (WDM) demultiplexor for receiving an input from the central node, the input including a wavelength channel at a wavelength dedicated to the particular user node and light at another wavelength dedicated to a different user node, and for sending the wavelength channel to the receiver and the light at the other wavelength to the modulator.

9. The optical communications system of claim 8 wherein the central node and the user nodes are configured into a star configuration.

10. The optical communications system of claim 8 wherein the modulator modulates the light at the other wavelength to provide a wavelength channel to the central node.

11. A method of providing a centralized wavelength source for optical communications, the method comprising:

receiving a request for light at a desired wavelength from a transmission node, the desired wavelength is determined based on a destination node;

selecting light at the desired wavelength from light at a plurality of wavelengths, the selecting performed by a wavelength selector having a set of individual wavelength selector circuits, one of the wavelength selector circuits corresponding to the transmission node;

transmitting the light at the desired wavelength to the transmission node for modulation into a wavelength channel at the desired wavelength;

receiving the wavelength channel from the transmission node; and directing the wavelength channel to a destination node.

* * * * *